United States Patent
Tan et al.

(10) Patent No.: US 11,445,341 B2
(45) Date of Patent: Sep. 13, 2022

(54) DYNAMIC WEIGHING DEVICE

(71) Applicants: Mettler-Toledo (Changzhou) Precision Instruments Co., Ltd., Changzhou (CN); Mettler-Toledo (Changzhou) Measurement Technology Co., Ltd., Changzhou (CN); Mettler-Toledo International Trading (Shanghai) Co., Ltd., Shanghai (CN)

(72) Inventors: Dake Tan, Changzhou (CN); Lifeng Cai, Changzhou (CN)

(73) Assignees: Mettler-Toledo (Changzhou) Precision Instruments Co., Ltd., Changzhou (CN); Mettler-Toledo (Changzhou) Measurement Technology Co., Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 21 days.

(21) Appl. No.: 16/949,318

(22) Filed: Oct. 26, 2020

(65) Prior Publication Data

US 2021/0127240 A1 Apr. 29, 2021
US 2022/0217510 A9 Jul. 7, 2022

(30) Foreign Application Priority Data

Oct. 25, 2019 (CN) .......................... 201911023945.4

(51) Int. Cl.
*H04W 4/38* (2018.01)
*H04J 3/06* (2006.01)
(Continued)

(52) U.S. Cl.
CPC ............. *H04W 4/38* (2018.02); *H04J 3/0658* (2013.01); *H04L 1/0002* (2013.01); *H04W 84/20* (2013.01); *H04W 84/22* (2013.01)

(58) Field of Classification Search
CPC ....... H04W 4/38; H04W 84/20; H04J 3/0658; H04L 1/0002; G01G 23/00; G01G 23/36; G01G 19/00
See application file for complete search history.

(56) References Cited

U.S. PATENT DOCUMENTS 7,211,748 B2 * 5/2007 Lauke ................ G01G 19/4142
177/199
7,447,931 B1 11/2008 Rischar et al.
(Continued)

FOREIGN PATENT DOCUMENTS

CN 107197514 A 9/2017
CN 208635900 U 3/2019

*Primary Examiner* — Jae Y Lee
*Assistant Examiner* — Aixa A Guadalupe Cruz
(74) *Attorney, Agent, or Firm* — Standley Law Group LLP; Jeffrey S. Standley; Stephen L. Grant

(57) ABSTRACT

A dynamic weighing device has a plurality of weighing sensors that constitute a weighing sensor network via Ethernet. One of the weighing sensors is selected as a primary node, which performs time synchronization with the other nodes via a time synchronization protocol. Alternatively, the other nodes synchronize a time offset relative to the time of the primary node. Each weighing sensor continuously packetizes and sends a plurality of consecutive pieces of weighing information to a terminal apparatus. The terminal apparatus calculates a weighed weight result of the dynamic weighing device at the same moment, based on time information in the weighing information obtained through depacketization, In such a weighing sensor network, by means of the time synchronization, weighing data at each moment is accurate when the weighing data is processed on a terminal such as a meter, thereby improving the reliability of sampling.

9 Claims, 1 Drawing Sheet

(51) Int. Cl.
*H04L 1/00* (2006.01)
*H04W 84/20* (2009.01)
*H04W 84/22* (2009.01)

(56) References Cited

U.S. PATENT DOCUMENTS

| | | | |
|---|---|---|---|
| 7,592,552 B2 | 9/2009 | Duppre | |
| 10,771,669 B1* | 9/2020 | Balasubramanian | ... G01S 7/003 |
| 10,820,292 B1* | 10/2020 | Peter | ... H04W 56/004 |
| 2020/0003610 A1* | 1/2020 | Shenhui | ... G01G 21/23 |
| 2020/0116548 A1* | 4/2020 | Dai | ... G01G 23/00 |
| 2021/0006344 A1* | 1/2021 | Chen | ... H04L 12/40 |

* cited by examiner

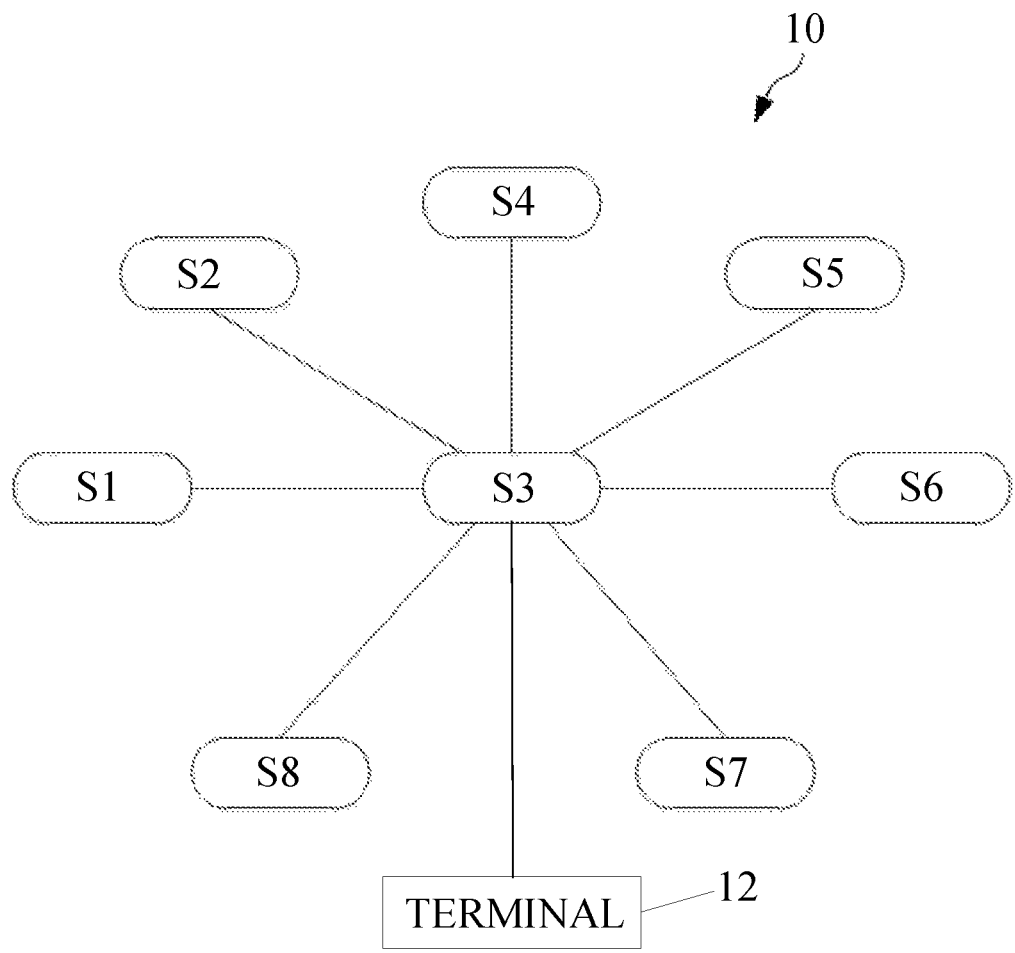

DYNAMIC WEIGHING DEVICE

CROSS-REFERENCE TO RELATED APPLICATIONS

This application is a non-provisional application that claims priority to Chinese patent application CN 201911023945.4 of 25 Oct. 2019, which is incorporated by reference as if fully recited herein.

TECHNICAL FIELD

The present invention relates to a dynamic weighing device, and in particular to a high-speed dynamic weighing device.

BACKGROUND ART

At present, weighing detection data of current dynamic weighing devices, in particular high-speed dynamic weighing devices, is unreliable. This is because sampling synchronization is poor. In addition, this is because sampling data cannot be transmitted effectively, in particular in the case of high-speed sampling, the reliability of transmission of a large amount of data cannot be ensured.

In the prior art, for a clock synchronization problem, there generally is a requirement for clock calibration apparatus external to a system, such as GPS (Global Positioning System) clock synchronization, or network time service, etc. If a clock synchronization apparatus or method in such manners is used, the production cost is significantly increased, and in practice, the reliability is mediocre, for example, a GPS signal is difficult to meet use requirements in indoor or metal shielded scenarios.

Additionally, existing weighing technologies usually use CAN (Controller Area Network) buses or RS485/RS422 (a type of bus) buses to transmit data. However, the data transmission rates of these buses are low, and clock synchronization is lacking. Therefore, synchronization precision of weighing data depends on the sampling rate of weights (this rate being less than 100 Hz), and requirements of dynamic weighing applications cannot be met.

Moreover, even if Ethernet is used in the weighing technologies, theoretically, the bandwidth of the Ethernet can meet the requirements of dynamic weighing, even high-speed dynamic weighing, but actually, a large number of data packets are produced by various nodes in the network, thereby inevitably causing congestion during information transmission, which results in the unreliability of a weighing device or system. Therefore, data packet transmission rate required for dynamic weighing cannot actually be reached.

SUMMARY OF THE INVENTION

The technical problem solved herein is unreliability of data sampling synchronization and effective transmission in dynamic weighing. In order to overcome this problem in the prior art, a dynamic weighing device is provided, wherein Ethernet is enabled to improve the reliability of sampling and data transmission of dynamic weighing by using an Ethernet information synchronization protocol and reducing the number of data packets.

The present invention solves the above technical problem through the technical solution of providing a device for dynamic weighing that comprises a plurality of weighing sensors constituting a weighing sensor network via Ethernet.

In such a weighing sensor network, one weighing sensor in the weighing sensor network is selected as a primary node. The primary node performs time synchronization with other nodes in the weighing sensor network via a time synchronization protocol, or the other nodes in the weighing sensor network synchronize a time offset relative to time of the primary node. Each weighing sensor continuously packetizes and sends a plurality of consecutive pieces of weighing information to a terminal apparatus, where the terminal apparatus calculates, based on time information in the weighing information obtained through depacketization, a weighed weight result of the dynamic weighing device at the same moment.

In this solution, the time synchronization protocol in Ethernet is used to implement time synchronization between the weighing sensors in the network and the weighing sensor which is the primary node, and therefore, the weighed weight result calculated, by the terminal, from weighing information obtained at the same moment is reliable, wherein the weighed weight result is a result, which can represent the weight of a weighed object, calculated from weighing data obtained by each weighing sensor in the weighing network.

Also, the method in which multiple pieces of data are packetized before being sent reduces the number of data packets transmitted in the Ethernet, and thereby avoiding congestion in transmission over the network, and increasing the transmission rate.

Further, the primary node performs a time synchronization with the other nodes in the weighing sensor network via a PTP or an NTP.

The PTP is short for Precision Timing Protocol, and the NTP is short for Network Time Protocol. High-precision time synchronization may be achieved by means of the two time synchronization protocols.

Still further, the primary node performs a time synchronization with the other nodes in the network at a preset time interval; or the other weighing sensors perform time a synchronization with the primary node at a preset time interval, or the other weighing sensors perform time verification with the primary node at a preset time interval, in which a weighing sensor with a time error exceeding an error threshold performs the time synchronization with the primary node.

Still further, the primary node sends a time synchronization broadcast to the other weighing sensors; and the other weighing sensors perform a time synchronization with the primary node, or the other weighing sensors perform a time verification with the primary node, in which a weighing sensor with a time error exceeding an error threshold performs the time synchronization with the primary node.

The time synchronization between the primary node and the other weighing sensors in the solution described above may be initiated by the primary node or the other weighing sensors.

When the other weighing sensors perform the time synchronization with the primary node, if the time errors of some of the weighing sensors do not exceed the threshold, these weighing sensors do not update their time, and the remaining weighing sensors whose time error exceed the threshold need to update their time to synchronize with the primary node.

Further, the primary node performs a time synchronization with the other nodes in the network, and updates the time offsets of the other nodes relative to the time of the primary node at a preset time interval; or the other weighing sensors perform a time verification with the primary node, and updates the time offsets of the other nodes relative to the time of the primary node at a preset time interval.

In this solution, during time synchronization between the primary node and the other weighing sensors, the time of the other time weighing sensors is not updated to be time of the primary node, but instead a difference (i.e. a time offset) between the time of the other weighing sensors and the time of the primary node is recorded. In this solution, a clock function or clock circuit in the weighing sensor does not need to have a time update function, instead time synchronization for all the weighing sensors in the network is performed conveniently by using the stored time offset.

Further, if a sum of data lengths of a continuously output weighing information by each weighing sensor reaches a threshold or waiting time for packetization exceeds a threshold, the continuously output weighing information is packetized and sent.

In this solution, in addition to using the sum of processed data lengths as a determination condition for packetization before sending, the waiting time for packetization is used to avoid that weighing data is sent too late, and as a result, the weighing data for which the terminal waits for a particular time cannot be used to calculate a weighed weight in time.

Still further, the terminal apparatus calculates, based on the time of the primary node and the time and the time offsets of the other weighing sensors in the weighing information obtained through depacketization, a weighed weight result of the dynamic weighing device at the same moment.

Further, the weighing sensor network selects one weighing sensor as a primary node through an election mechanism, or the weighing sensor network selects one weighing sensor as a primary node, and another weighing sensor as a secondary node through an election mechanism, and when the primary node fails, the secondary node becomes a primary node.

Still further, when the secondary node becomes the primary node, the weighing sensor network selects a new secondary node through the election mechanism.

In the solution described above, the primary node and the secondary node are selected from the network constituted by the weighing sensors by using the node election mechanism in existing network technologies. When the election mechanism and the primary and secondary nodes are used, provided that a necessary number of nodes are present in the weighing sensor network, the data transmission function of the entire network is not lost. Therefore, such a drawback is avoided that in settings of primary and secondary nodes in the traditional weighing sensor network, the entire weighing sensor network fails due to a failure of the primary node.

The positive and progressive effects of the above solution are that, In a weighing sensor network, by means of time synchronization between sensors, weighing data at each moment is accurate when the weighing data is processed on a terminal such as a meter, thereby improving the reliability of sampling.

Moreover, in a weighing sensor network, an amount of weighing data to be transmitted in the network is reduced and thus transmission reliability of the data is improved by packetizing and sending multiple segments of data.

BRIEF DESCRIPTION OF THE DRAWINGS

The single FIG. 1 is a topological diagram of a weighing sensor network according to an embodiment of the present invention.

DETAILED DESCRIPTION OF EMBODIMENTS

The present invention will be further described below by way of embodiments, but the present invention is not therefore limited to the scope of the described embodiments.

In the present invention, all weighing sensors in a device constitute a network, and synchronize the time of all the weighing sensors to a reference time, taking the time of the weighing sensor which is the primary node as the reference. Therefore, time information in the weighing information output by each weighing sensor is completely synchronous, and thus during the process in which a terminal weighs weights, the weight of the object loaded at any one particular moment may be calculated accurately. That is, timestamps are added to weighing data output by each weighing sensor, so that the terminal is always able to accurately obtain the weighing data output by each weighing sensor at the same moment.

Also, by means of packetizing a plurality of output pieces of weighing data in each weighing sensor, the risk of network transmission congestion brought by production of a large amount of data is avoided.

Hereinafter, the implementation of the present invention will be illustrated by way of example via the following embodiments.

In a high-speed dynamic checkweigher 10 of this embodiment, the whole checkweigher comprises eight weighing sensors S1, S2, S3, S4, S5. S6. S7, S8, in communication through a network with a terminal 12. During a checkweigher initialization process, the eight weighing sensors utilize an election mechanism to select a weighing sensor S3 as a primary node, and the other seven weighing sensors together with the weighing sensor S3 constitute a star topology shown in FIG. 1. Also, the weighing sensor S3 achieves time synchronization with the other weighing sensors via a PTP protocol.

In this embodiment, the weighing sensor S3 sends a time synchronization broadcast to the other seven weighing sensors every 10 seconds. The weighing sensors send a request to perform time synchronization with the weighing sensor S3 using the PTP protocol after receiving the broadcast.

In another embodiment, the other seven weighing sensors respectively initiate a synchronization request to the weighing sensor S3 at intervals of 10 seconds, and the weighing sensor S3 performs time synchronization with the corresponding weighing sensors using the PTP protocol after receiving the request.

In still another embodiment, the other weighing sensors send time verification information to the weighing sensor S3, which compares the time of the other weighing sensors and that of itself. If time errors of the weighing sensors S1, S2 and S4 exceed 1 ms, the weighing sensor S3 directly initiates time synchronization with the weighing sensors S1, S2 and S4. In another variant, the weighing sensors S1, S2 and S4 respectively find that there is a time error, and initiate a synchronization request to the weighing sensor S3, which performs time synchronization after receiving the request. Time errors of the weighing sensors S5, S6, S7 and S8 do not exceed 1 ms, and the weighing sensors will not perform any time synchronization operation.

The time synchronization in the embodiments described above is to synchronize the time of the other weighing sensors to the time of the weighing sensor S3, which requires that each weighing sensor has an ability to modify the time of a clock module behind the internal circuit inside a sensor.

In another embodiment, the weighing sensor S3 stores time differences between the other seven weighing sensors and the weighing sensor S3 in the corresponding weighing sensors, when performing time synchronization with the other weighing sensors. For example, the time of the weighing sensor S7 has a difference of −2 ms from the time of the weighing sensor S3. In this case, the difference of −2 ms is stored in the weighing sensor S7. Then, when the weighing sensor S7 outputs time information, the time difference of −2 ms is included, thereby the finally output time is consistent with the time of the weighing sensor S3. As such, each weighing sensor only needs to record a time difference from the primary node, and counts this difference in subsequent time calculation so as to have a same moment, and the clock function in a weighing sensor no longer needs to have an ability to calibrate, update, etc.

In this embodiment, time synchronization in the weighing sensor network 10 is performed continuously so that time information output by all the weighing sensors in the entire network remains consistent.

While time synchronization is performed continuously over the network 10, if objects to be weighed are constantly loaded onto the high-speed checkweigher, the weighing sensors numbered S1 to S8 continuously output weighing data. In this embodiment, if the sum of bytes of the weighing data output by each weighing sensor reaches 100 bytes, the weighing data will be packetised before being sent to a meter. And if the sum of bytes of the weighing data output does not reach 100 bytes, but waiting time exceeds 1 ms, the weighing data that has been collected is forced to be packetized and sent to the meter.

After receiving the weighing data respectively packetized and sent by the eight weighing sensors S1 to S8, the meter depacketizes the data packets, performs calculation on the weighing data from the eight weighing sensors, which have timestamps of the same moment, and obtains the weighed weight of the object to be weighed on the high-speed dynamic checkweigher at this moment.

In a further embodiment, and with the exception of weighing sensor S3, the other weighing sensors store time differences, and when the meter screens the weighing data at the same moment, the timestamps of the other seven weighing sensors should count the time differences, so that the weighing data at indeed the same moment can be obtained through screening.

In a still further embodiment, after selecting the weighing sensor S3 as the primary node, the network 10 further selects the weighing sensor S7 as the secondary node by means of the election mechanism. In this embodiment, only when the weighing sensor S3 fails, the weighing sensor S7 in the network 10 automatically takes over as a primary node, and again, a new secondary node is selected from the remaining effective weighing sensors. In this embodiment, the reliability of a weighing sensor network is improved by means of node backup.

Although specific implementations of the present invention have been described above, those skilled in the art should understand that these are merely examples, and the scope of protection of the present invention is defined by the appended claims. Those skilled in the art may make various changes or modifications to these embodiments without departing from the principles and essence of the present invention, but all these changes and modifications fall within the scope of protection of the present invention.

What is claimed is:

1. A device for dynamic weighing, comprising:
a plurality of weighing sensors constituting a weighing sensor network via Ethernet, wherein one weighing sensor of the plurality is selected as a primary node, to perform time synchronization with each of the other weighing sensors either by way of a time synchronization protocol, or by way of the other weighing sensors synchronizing a time offset relative to a time of the primary node;
wherein each weighing sensor continuously packetizes and sends a plurality of consecutive pieces of weighing information to a terminal apparatus; and
wherein the terminal apparatus calculates a weighed weight result of the dynamic weighing device at the same moment, based on time information in the weighing information obtained through depacketization.

2. The device of claim 1, wherein the primary node performs a time synchronization with the other weighing sensors via a Precision Timing Protocol ("PTP") or a Network Time Protocol ("NTP").

3. The device of claim 1, wherein:
the primary node performs a time synchronization with the other weighing sensors at a preset time interval; or
the other weighing sensors perform a time synchronization with the primary node at a preset time interval; or
the other weighing sensors perform a time verification with the primary node at a preset time interval, in which any weighing sensor with a time error exceeding an error threshold performs the time synchronization with the primary node.

4. The device of claim 1, wherein:
the primary node sends a time synchronization broadcast to the other weighing sensors; and
the other weighing sensors perform a time synchronization with the primary node, or the other weighing sensors perform a time verification with the primary node, in which any weighing sensor with a time error exceeding an error threshold performs the time synchronization with the primary node.

5. The device of claim 1, wherein:
the primary node performs a time synchronization with the other weighing sensors in the network, and updates the time offsets of the other weighing sensors relative to the time of the primary node at a preset time interval; or
the other weighing sensors perform a time verification with the primary node, and updates the time offsets of the weighing sensors relative to the time of the primary node at a preset time interval.

6. The device according to claim 1, wherein:
if a sum of data lengths of a continuously output weighing information by each weighing sensor reaches a threshold; or
if a waiting time for packetization exceeds a threshold; then
the continuously output weighing information is packetized and sent.

7. The device of claim 5, wherein the terminal apparatus calculates a weighed weight result of the dynamic weighing device at the same moment, based on the time of the primary node and the time and the time offsets of the other weighing sensors in the weighing information obtained through depacketization.

8. The device of claim 1, wherein:
the weighing sensor network selects one weighing sensor as a primary node through an election mechanism; or the weighing sensor network selects one weighing sensor as a primary node, and another weighing sensor as a secondary node through an election mechanism, such that if the primary node fails, the secondary node becomes the primary node.

9. The device of claim 8, wherein when the secondary node becomes the primary node, the weighing sensor network selects a new secondary node through the election mechanism.

* * * * *